(12) United States Patent
Jeong et al.

(10) Patent No.: US 11,449,017 B2
(45) Date of Patent: Sep. 20, 2022

(54) APPARATUS AND METHOD FOR OPTIMIZING CONTROL PARAMETERS OF POWER PLANT

(71) Applicant: DOOSAN ENERBILITY CO., LTD., Changwon-si (KR)

(72) Inventors: Kwang Hun Jeong, Changwon (KR); Moon Il Kang, Changwon (KR); Young Oon Kim, Suwon (KR); Hyo Jun Kim, Suwon (KR); Jeong Hyeon Oh, Changwon (KR); Jun Taek Im, Changwon (KR); Woo Won Jeon, Yongin (KR); Hyung Keun Chi, Yongin (KR)

(*) Notice: Subject to any disclaimer, the term of this patent is extended or adjusted under 35 U.S.C. 154(b) by 49 days.

(21) Appl. No.: 17/133,109

(22) Filed: Dec. 23, 2020

(65) Prior Publication Data

US 2021/0223749 A1 Jul. 22, 2021

(30) Foreign Application Priority Data

Jan. 20, 2020 (KR) .................. 10-2020-0007357

(51) Int. Cl.
| | | |
|---|---|---|
| G05B 13/04 | (2006.01) | |
| F01K 3/26 | (2006.01) | |
| F22G 5/12 | (2006.01) | |
| F01K 13/02 | (2006.01) | |
| F01D 21/00 | (2006.01) | |
| F01D 19/00 | (2006.01) | |
| F01D 17/04 | (2006.01) | |

(52) U.S. Cl.
CPC ........... *G05B 13/045* (2013.01); *F01D 17/04* (2013.01); *F01D 19/00* (2013.01); *F01D 21/00* (2013.01); *F01K 3/262* (2013.01); *F01K 13/02* (2013.01); *F22G 5/12* (2013.01)

(58) Field of Classification Search
CPC .... G05B 13/045; G05B 13/04; G05B 13/042; G05B 13/048; G05B 19/41885; F01D 17/04; F01D 19/00; F01D 21/00; F01K 3/262; F01K 13/02; F22G 5/12
USPC ..................................... 60/646, 657
See application file for complete search history.

(56) References Cited

U.S. PATENT DOCUMENTS 5,584,172 A * 12/1996 Oguchi .............. B01D 53/8625
60/39.24
8,447,564 B2 5/2013 Gross et al.
(Continued)

FOREIGN PATENT DOCUMENTS

| KR | 102001041714 A | 5/2001 |
|---|---|---|
| KR | 101707290 B1 | 2/2017 |
| KR | 101737968 B1 | 5/2017 |

OTHER PUBLICATIONS

KR OA dated Mar. 25, 2021.

*Primary Examiner* — Hoang M Nguyen
(74) *Attorney, Agent, or Firm* — Harvest IP Law, LLP

(57) ABSTRACT

An apparatus for optimizing control parameters of a power plant is provided. The apparatus for optimizing control parameters of a power plant includes: a model generator configured to configure a forecast model including a process model and a control model, a model corrector configured to correct a first parameter of the process model through operation data of a real power plant, and a tuner configured to tune a second parameter, which is a parameter related to a time delay of the forecast model, so as to have a target load increase rate.

20 Claims, 6 Drawing Sheets

(56) References Cited

U.S. PATENT DOCUMENTS

| | | |
|---|---|---|
| 2007/0055392 A1 | 3/2007 | D'Amato |
| 2014/0033707 A1* | 2/2014 | Rodionov ............... F03D 9/007 60/719 |
| 2017/0102162 A1* | 4/2017 | Drees ...................... H02J 3/008 |
| 2019/0271464 A1* | 9/2019 | Huang ................... F22B 35/18 |

* cited by examiner

10

APPARATUS AND METHOD FOR OPTIMIZING CONTROL PARAMETERS OF POWER PLANT

CROSS-REFERENCE TO RELATED APPLICATION

This application claims priority to Korean Patent Application No. 10-2020-0007357, filed on Jan. 20, 2020, the disclosure of which is incorporated by reference herein in its entirety.

BACKGROUND

Field

Apparatuses and methods consistent with exemplary embodiments relate to a technology for optimizing control parameters, and more particularly, to an apparatus and a method for optimizing control parameters for improving a load change rate of a power plant.

Description of the Related Art

A load change rate of a power plant relates to how much an output of the power plant changes in unit time and is one of the important indicators representing a responsiveness of the power plant together with a startup time of the power plant, the minimum and maximum loads of the power plant, and the like. In recent years, renewable energy having high output variability is rapidly expanded such that the improvement in the responsiveness of the related art coal-fired power plant is required in terms of power grid stabilization. The startup time of the power plant is related to the life of the power plant and the minimum and maximum loads of the power plant are related to static performance, so all of these must be approached from a design perspective. However, because only a suggested steam temperature deviation condition provided for the load change rate is satisfied, a sufficient approach is possible only from the operation perspective. However, because there are many different process control factors that can affect the load change rate, even if it is accessible from the operation perspective, there is a limit to improving the load change rate through simple tuning. Indeed, the tuning of control parameters related to improving the load change rate in many cases falls within the realm of experts with sufficient experience. Further, in some cases, the tuned control parameters may not be used in addition to special situations caused by cycling or hunting of the power plant.

SUMMARY

Aspects of one or more exemplary embodiments provide an apparatus and a method for optimizing control parameters for improving a load change rate of a power plant.

Additional aspects will be set forth in part in the description which follows and, in part, will become apparent from the description, or may be learned by practice of the exemplary embodiments.

According to an aspect of an exemplary embodiment, there is provided an apparatus for optimizing control parameters of a power plant including: a model generator configured to configure a forecast model including a process model and a control model, a model corrector configured to correct a first parameter of the process model through operation data of a real power plant, and a tuner configured to tune a second parameter, which is a parameter related to a time delay of the forecast model, so as to have a target load increase rate.

The operation data may include an input value and an output value corresponding to the input value, and the model corrector may correct the first parameter such that a root mean square deviation (RMSD) or a mean absolute deviation (MAD) between a calculation value of the process model and the operation data of the real power plant become the minimum when the input value is input to the process model.

The model corrector may correct the first parameter within a preset correction range.

The first parameter may include at least one of a property curve of a spray valve, a time delay of a fuel, and a property time of a heat exchanger.

The tuner may provide an input variable and a target value corresponding to the input variable when the forecast model includes one or more functions including the second parameter, and the tuner may correct the second parameter such that a difference between a forecast value of the forecast model and the target value becomes the minimum when the input variable is input to the forecast model.

The second parameter may be a parameter related to the time delay.

The process model may include a flow rate calculating module configured to calculate the flow rate of a superheater reducer, a heat-input calculating module configured to calculate a heat-input, and a steam temperature calculating module configured to calculate a steam temperature.

The model generator may model each of the flow rate calculating module, the heat-input calculating module, and the steam temperature calculating module in a form of a block line diagram based on a time delay function.

According to an aspect of another exemplary embodiment, there is provided an apparatus for optimizing control parameters of a power plant including: a model corrector configured to correct a first parameter of a process model through operation data of a real power plant in a forecast model including the process model and a control model, and a tuner configured to tune a second parameter, which is a parameter related to a time delay of the forecast model, so as to have a target load increase rate.

The operation data may include an input value and an output value corresponding to the input value, and the model corrector may correct the first parameter such that a root mean square deviation (RMSD) or a mean absolute deviation (MAD) between a calculation value of the process model and the operation data of the real power plant becomes the minimum when the input value is input to the process model.

The model corrector may correct the first parameter within a preset correction range.

The first parameter may include at least one of a property curve of a spray valve, a time delay of a fuel, and a property time of a heat exchanger.

The tuner may provide an input variable and a target value corresponding to the input variable when the forecast model includes one or more functions including the second parameter, and the tuner may correct the second parameter such that a difference between a forecast value of the forecast model and the target value becomes the minimum when the input variable is input to the forecast model.

The second parameter may be a parameter related to the time delay.

According to an aspect of another exemplary embodiment, there is provided a method for optimizing control parameters of a power plant including: configuring, by a model generator, a forecast model including a process model and a control model, correcting, by a model corrector, a first parameter of the process model through operation data of a real power plant, and tuning, by a tuner, a second parameter, which is a parameter related to a time delay of the forecast model, so as to have a target load increase rate.

The operation data may include an input value and an output value corresponding to the input value, and the correcting the first parameter of the process model may include correcting, by the model corrector, the first parameter such that a root mean square deviation (RMSD) or a mean absolute deviation (MAD) between a calculation value of the process model and the operation data of the real power plant becomes the minimum when the input value is input to the process model.

The correcting the first parameter of the process model may include correcting, by the model corrector, the first parameter within a preset correction range.

The first parameter may include at least one of a property curve of a spray valve, a time delay of a fuel, and a property time of a heat exchanger.

The tuning the second parameter may include providing, by the tuner, an input variable and a target value corresponding to the input variable when the forecast model includes one or more functions including the second parameter, and correcting the second parameter such that a difference between a forecast value of the forecast model and the target value becomes the minimum when the input variable is input to the forecast model.

The second parameter may be a parameter related to the time delay.

The process model may include a flow rate calculating module configured to calculate the flow rate of a superheater reducer, a heat-input calculating module configured to calculate a heat-input, and a steam temperature calculating module configured to calculate a steam temperature.

According to one or more exemplary embodiments, it is possible to modify and optimize parameters on the control system of the coal-fired power plant, thereby improving the load change rate. Further, it is possible to lower the power supply ranking through improving load change rate and to improve the load followability of the power plant, thereby contributing to generating additional revenue from the operation of the power plant. Further, the improvement of the load followability may be connected with the power grid stability, thereby alleviating the problem caused by expansion of the renewable energy having high output variability.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
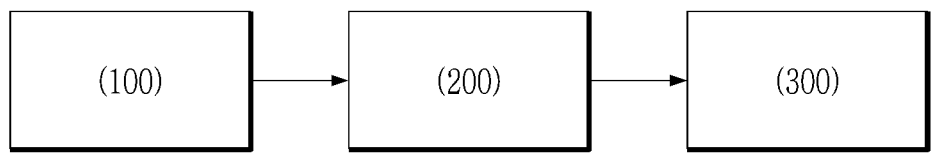
FIG. 1 is a block diagram for explaining a configuration of an apparatus for optimizing control parameters of a power plant according to an exemplary embodiment.

Various changes and various exemplary embodiments will be described in detail with reference to the accompanying drawings so that those skilled in the art can easily carry out the disclosure. It should be understood, however, that the various embodiments are not for limiting the scope of the disclosure to the particular disclosed forms, but they should be interpreted to include all modifications, equivalents, and alternatives of the embodiments included within the sprit and technical scope disclosed herein.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module," "a unit," or "a part" in the disclosure performs at least one function or operation, and these elements may be implemented as hardware, such as a processor or integrated circuit, software that is executed by a processor, or a combination thereof. Further, a plurality of "modules," a plurality of "units," or a plurality of "parts" may be integrated into at least one module or chip and may be implemented as at least one processor except for "modules," "units" or "parts" that should be implemented in a specific hardware.

The terms used in the exemplary embodiments are for the purpose of describing specific exemplary embodiments only, and are not intended to limit the scope of the disclosure. The singular forms "a", "an", and "the" are intended to include the plural forms as well unless the context clearly indicates otherwise. In the disclosure, terms such as "comprises," "includes," or have/has" should be construed as designating that there are such features, integers, steps, operations, components, parts and/or a combination thereof, not to exclude the presence or possibility of adding of one or more other features, integers, steps, operations, components, parts and/or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
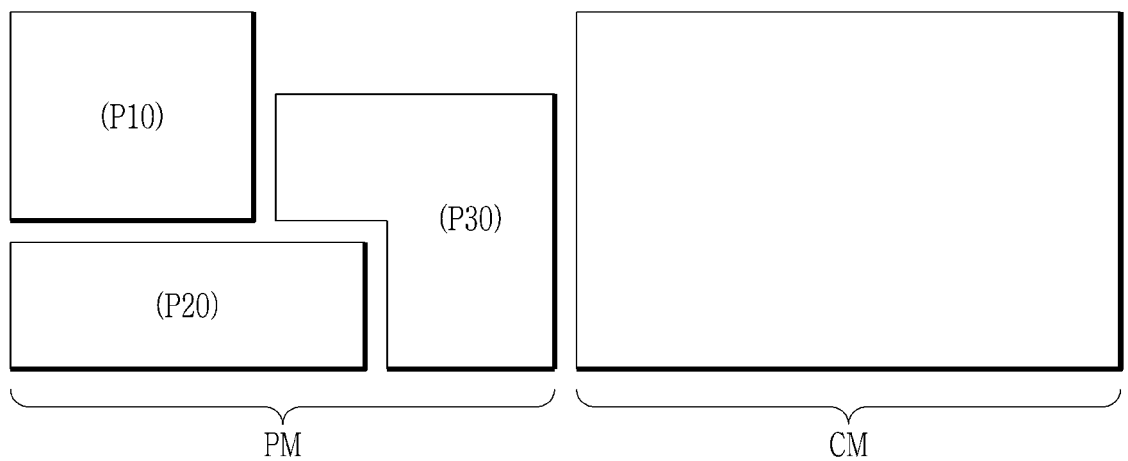
FIG. 2 is a block diagram for explaining a configuration of a forecast model (FM) of a load change rate according to an exemplary embodiment.
Figure 3:
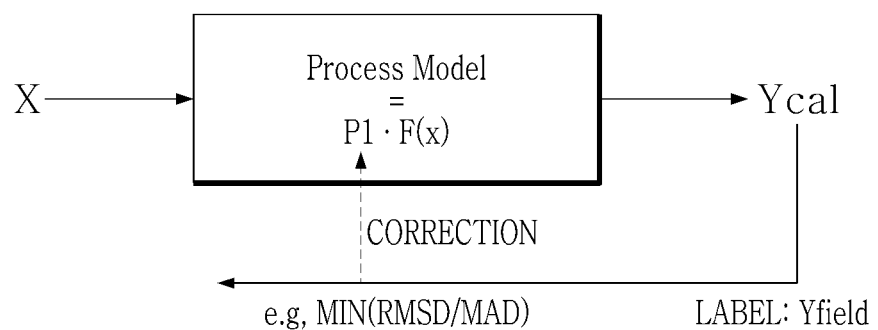
FIG. 3 is a diagram for explaining a method for learning a process model according to an exemplary embodiment.
Figure 4:
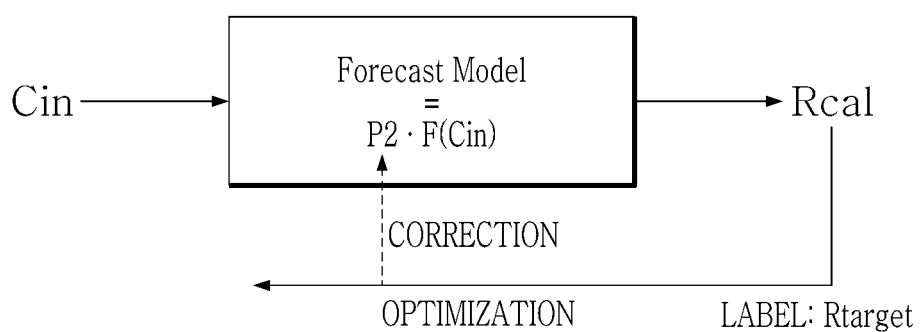
FIG. 4 is a diagram for explaining a method for tuning a time delay parameter of the forecast model according to an exemplary embodiment.

FIG. 1 is a block diagram for explaining a configuration of an apparatus for optimizing control parameters of a power plant according to an exemplary embodiment. FIG. 2 is a block diagram for explaining a configuration of a forecast model (FM) of a load change rate according to an exemplary embodiment. FIG. 3 is a diagram for explaining a method for learning a process model according to an exemplary embodiment. FIG. 4 is a diagram for explaining a method for tuning a time delay parameter of the forecast model according to an exemplary embodiment.

Referring to FIG. 1, an apparatus for optimizing control parameters of a power plant according to an exemplary embodiment (hereinafter, referred to as 'optimization apparatus') reflects both various process factors and control factors related to a load change rate of the power plant to generate a forecast model of the load change rate, and tunes control parameters of the forecast model to improve the load change rate. The optimization apparatus 10 according to the exemplary embodiment may tune the control parameters in consideration of various factors related to the load change rate, thereby preventing the power plant from becoming unstable such as cycling or hunting and improving the load change rate. To this end, the optimization apparatus 10 includes a model generator 100, a model corrector 200, and a tuner 300.

The model generator 100 configures the forecast model (FM) of the load change rate. Referring to FIG. 2, the forecast model (FM) of the load change rate includes a process model (PM) and a control model (CM) for forecasting a steam temperature.

Assuming that an output represented by mW sufficiently follows the turbine master demand on a control logic, the key to the process model (PM) is a steam temperature forecast. That is, because the steam temperature deviation is a limit condition of the load change rate, it is most important to forecast the steam temperature.

The process model (PM) for forecasting the steam temperature includes a flow rate calculating module P10 that calculates the flow rate of a superheater reducer, a heat-input calculating module P20 that calculates the heat-input, and a steam temperature calculating module P30 that calculates a steam temperature. Each of the flow rate calculating module P10, the heat-input calculating module P20, and the steam temperature calculating module P30 is modeled in the form of a block line diagram based on a time delay function in consideration of a calculation speed and stability. Therefore, the flow rate calculating module P10 includes at least a transfer function of calculating the flow rate of the superheater reducer, the heat-input calculating module P20 includes at least a transfer function of calculating the heat-input, and the steam temperature calculating module P30 includes at least a transfer function of calculating the steam temperature.

The transfer function of each flow rate calculating module P10, heat-input calculating module P20, and steam temperature calculating module P30 has the property curve of a spray valve, a time delay of a fuel, and the property time of a heat exchanger as parameters.

The control module (CM) calculates a boiler master demand, a coal master demand, and the like considering a unit load demand current target and a transient state compensation based on a unit load demand, which is an input value. At this time, various functions expressed as f(x) and necessary for calculation are based on a real site value in principle, and a control logic design value is used if it is difficult to obtain the real site value.

The model corrector 200 corrects the process model (PM) with operation data of the real power plant. Even if the process model (PM) is a mathematical and physical model based on theory, the process model (PM) is inevitably different from reality, and unless the difference is corrected, there is a limit to applying an optimized control parameter value derived later to the rear power plant. To alleviate the problem, the exemplary embodiment selects and modifies the parameter deemed to have relatively large uncertainty including the property curve of the spray valve, the time delay of the fuel, the property time of the heat exchanger, and the like in the process model (PM) utilizing the previously stored operation data of the real power plant.

As expressed in Equation 1 or Equation 2 below, the model corrector 200 modifies the parameter of the process model (PM) such that a root mean square deviation (RMSD) or a mean absolute deviation (MAD) between the calculation value of the process model (PM) and the real power plant operation data becomes the minimum.

$$RMSD = \sqrt{\frac{\sum_{time}(y_{cal} - y_{field})^2}{N}} \qquad \text{Equation 1}$$

$$MAD = \frac{\sum_{time}|y_{cal} - y_{field}|}{N} \qquad \text{Equation 2}$$

In the Equation 1 and the Equation 2, RMSD refers to root mean square deviation, and MAD refers to mean absolute deviation. For example, when there is the input value x of the real power plant operation data, the $y_{cal}$ refers to the calculation value of the process model (PM) when the input value x is input to the process model (PM), and the $y_{field}$ refers to the output value of the operation data of the real power plant in response to the input value x.

The process model (PM) includes one or more functions including the parameter, and when the model corrector 200 inputs the input value x to the process model (PM), the function of the process model (PM) applies the parameter to perform an operation on the input value x and outputs the calculation value $y_{cal}$. Then, the model corrector 200 calculates the root mean square deviation (RMSD) or the mean absolute deviation (MAD) according to the Equation 1 or the Equation 2 through the calculation value $y_{cal}$ and the output value $y_{field}$ of the real power plant operation data for the input value x, and corrects the parameter of the process model (PM) such that the root mean square deviation (RMSD) or the mean absolute deviation (MAD) becomes the minimum.

At this time, the model corrector 200 corrects the parameter of the process model (PM) within a preset correction range. For example, the correction range may be 20% to 30% of the original value of the parameter. Therefore, this prevents problems caused by excessive correction.

The tuner 300 tunes a time delay parameter P2 of the forecast model (FM) to have a target load increase rate through the operation data of the real power plant.

A physical system of the real power plant has a time delay due to changes in density and energy within the system. The time delay factor is a concept of inertia and is also considered in a control system that reflects the physical property. This means that the response property of the power plant may be improved if the accurate time delay factor of the physical system is reflected to the control system. Based on the concept, the exemplary embodiment modifies the parameter on the control logic, particularly, the parameter P2 related to the time delay to improve the load change rate of the power plant.

The tuner 300 optimizes the time delay parameter by using the load change rate for the forecast model (FM) of the load change rate as a target variable and the control parameter as an input variable.

Referring to FIG. 4, the tuner 300 sets a target variable $R_{target}$, which is the target load change rate, as a target value. The forecast model (FM) includes one or more functions $F(C_{in})$ including the time delay parameter P2, and if the tuner 300 inputs the input variable $C_{in}$, which is the control parameter, to the forecast model (FM), the function $F(C_{in})$ of the forecast model (FM) applies the time delay parameter P2 to perform the operation for the input variable $C_{in}$ and outputs a forecast value $R_{cal}$. Here, the forecast value $R_{cal}$ refers to the load change rate forecasted by the forecast model (FM), when the input variable $C_{in}$ is input. The tuner 300 corrects the time delay parameter P2 of the forecast model (FM) such that a difference between the forecast value $R_{cal}$ and the target value $R_{target}$ becomes the minimum.

Figure 5:
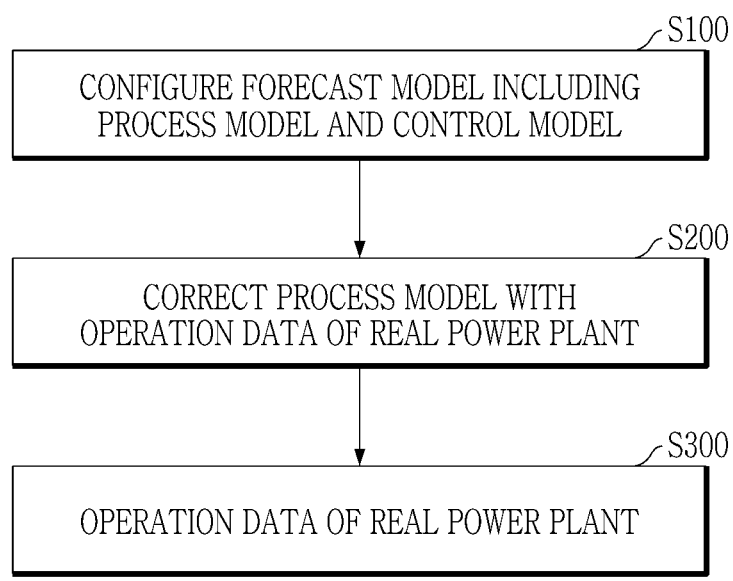
FIG. 5 is a flowchart for explaining a method for optimizing control parameters of the power plant according to an exemplary embodiment.

FIG. 5 is a flowchart for explaining a method for optimizing control parameters of the power plant according to an exemplary embodiment.

The model generator 100 configures the forecast model (FM) of the load change rate (in operation S110). Referring to FIG. 2, the forecast model (FM) includes the process model (PM) and the control model (CM).

The process model (PM) includes the flow rate calculating module P10 that calculates the flow rate of the superheater reducer, the heat-input calculating module P20 that calculates the heat-input, and the steam temperature calculating module P30 that calculates the steam temperature. The model generator 100 models the flow rate calculating module P10, the heat-input calculating module P20, and the steam temperature calculating module P30 in the form of the block line diagram based on the time delay function. Therefore, the flow rate calculating module P10 includes at least the transfer function of calculating the flow rate of the superheater reducer, the heat-input calculating module P20 includes at least the transfer function of calculating the heat-input, and the steam temperature calculating module P30 includes at least the transfer function of calculating the steam temperature. The transfer function of each flow rate calculating module P10, heat-input calculating module P20, and steam temperature calculating module P30 has a parameter P1 including the property curve of the spray valve, the time delay of the fuel, and the property time of the heat exchanger.

The control module (CM) calculates the boiler master demand, the coal master demand, and the like considering the unit load demand current target and the transient state compensation based on the unit load demand which is the input value. At this time, various functions expressed as f(x) and necessary for calculation are based on the real site value in principle, and the control logic design value is used if it is difficult to obtain the real site value.

The model corrector 200 corrects the process model (PM) with the operation data of the real power plant (in operation S120). The exemplary embodiment selects and modifies the parameter P1 deemed to have relatively large uncertainty including the property curve of the spray valve, the time delay of the fuel, the property time of the heat exchanger, and the like in the process model (PM) utilizing the previously stored operation data of the real power plant.

At this time, the model corrector 200 modifies the parameter P1 of the process model (PM) such that the root mean square deviation (RMSD) or the mean absoluter deviation (MAD) between the calculation value of the process model (PM) and the operation data of the real power plant becomes the minimum as expressed in the Equation 1 or the Equation 2. Here, the parameter P1 includes the property curve of the spray valve, the time delay of the fuel, the property time of the heat exchanger, and the like deemed to have relatively large uncertainty. Referring to FIG. 3, the process model (PM) includes one or more functions including the parameter, and when the model corrector 200 inputs the input value x to the process model (PM), the function of the process model (PM) applies the parameter to perform the operation for the input value x and outputs the calculation value $y_{cal}$. Then, the model corrector 200 calculates the root mean square deviation (RMSD) or the mean absolute deviation (MAD) according to the Equation 1 or the Equation 2 through the calculation value $y_{cal}$ and the output value $y_{field}$ of the operation data of the real power plant for the input value x, and corrects the parameter P1 of the process model (PM) such that the root mean square deviation (RMSD) or the mean absolute deviation (MAD) becomes the minimum. At this time, the model corrector 200 corrects the parameter of the process model (PM) within the preset correction range. For example, the correction range may be 20% to 30% of the original value of the parameter. Therefore, this prevents problems caused by excessive correction.

Next. the tuner 300 tunes the time delay parameter P2 of the forecast model (FM) such that the forecast model (FM) has the target load increase rate (in operation S130). Here, the tuner 300 optimizes the time delay parameter by using the load change rate for the forecast model (FM) of the load change rate as the target variable and the control parameter as the input variable. Referring to FIG. 4, the tuner 300 sets the target variable $R_{target}$, which is the target load change rate, as the target value. The forecast model (FM) includes one or more functions $F(C_{in})$ including the time delay parameter P2, and if the tuner 300 inputs the input variable $C_{in}$, which is the control parameter, to the forecast model (FM), the function $F(C_{in})$ of the forecast model (FM) applies the time delay parameter P2 to perform the operation for the input variable $C_{in}$ to output the forecast value $R_{cal}$. Here, the forecast value $R_{cal}$ is the load change rate forecasted by the forecast model (FM) when the input variable $C_{in}$ is input. The tuner 300 corrects the time delay parameter P2 of the forecast model (FM) such that the difference between the forecast value $R_{cal}$ and the target value $R_{target}$ becomes the minimum.

As described above, the forecast model (FM) according to the exemplary embodiment may improve the load change rate of the coal-fired power plant, and configure the related optimization system. The exemplary embodiment may correct the parameter of the model operated on the control system to reduce the possibility for the power grid to become unstable by the expansion of the renewable energy having high output variability, and improve the responsiveness of the power plant such that the related art coal-fired power plant may act as a bridge at the time of the transition to the renewable energy. To this end, the exemplary embodiment corrects the process model with the operation data of the real power plant based on the forecast model of the load change rate to secure the sufficient forecast accuracy, and then tunes the time delay parameter to have the target load change rate.

The exemplary embodiment may modify and optimize the parameter on the control system of the coal-fired power plant, thereby improving the load change rate. It is possible to lower the power supply ranking and improve the load followability of the power plant through improving the load change rate, thereby contributing to generating additional revenue from the operation of the power plant. Improving the rate of load fluctuation can lower the power supply ranking and improve the load followability of the power plant, which can contribute to generating additional revenue from power plant operations. Further, the improvement of the load followability may be connected with the power grid stability, thereby alleviating the problem caused by the expansion of the renewable energy having high output variability.

Figure 6:
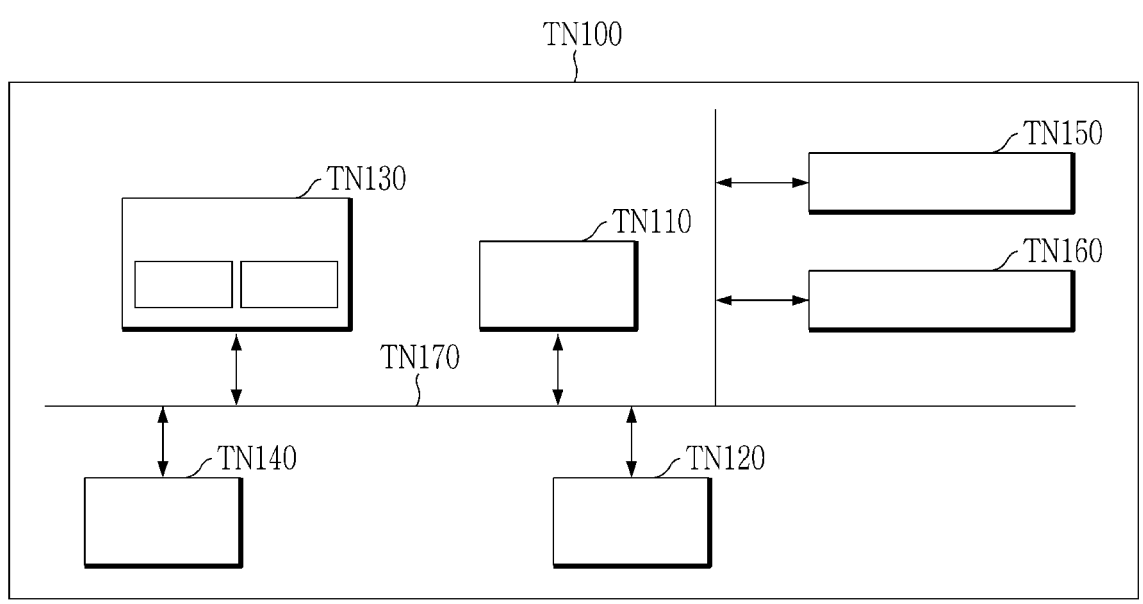
FIG. 6 is a diagram illustrating a computing apparatus according to an exemplary embodiment.

FIG. 6 is a diagram illustrating a computing apparatus according to an exemplary embodiment. A computing apparatus TN100 may be the apparatus described in the present specification (e.g., apparatus for optimizing the control parameters of the power plant or the like).

Referring to FIG. 6, the computing apparatus TN100 may include at least one processor TN110, a transceiver TN120, a memory TN130. The computing apparatus TN100 may further include a storage TN140, an input interface TN150, an output interface TN160. The components included in the computing apparatus TN100 may be connected by a bus TN170 and communicate with each other.

The processor TN110 may execute a program command stored in at least one of the memory TN130 and the storage TN140. The processor TN110 may include a central processing unit (CPU), a graphics processing unit (GPU), or a dedicated processor in which the methods according to the exemplary embodiment are performed. The processor TN110 may be configured to implement the procedure, function, method, and the like described with regard to the exemplary embodiment. The processor TN110 may control each component of the computing apparatus TN100.

Each of the memory TN130 and the storage TN140 may store various information related to an operation of the processor TN110. Each of the memory TN130 and the storage TN140 may be composed of at least one of a volatile storage medium and a non-volatile storage medium. For example, the memory TN130 may be composed of at least one of a read only memory (ROM) and a random access memory (RAM).

The transceiver TN120 may transmit and/or receive a wired signal or a wireless signal. The transceiver TN120 may be connected to a network to perform communication.

Meanwhile, various methods according to the exemplary embodiment described above may be implemented in the form of a readable program through various computer means and recorded in a computer readable recording medium. Here, the recording medium may include program commands, data files, data structures, and the like alone or in combination thereof. The program commands recorded in the recording medium may be those specially designed and configured for the exemplary embodiment or may also be those known and available to those skilled in the art of computer software. For example, the recording medium includes a hardware device specially configured to store and execute the program command such as magnetic media such as a hard disk, a floppy disk, and a magnetic tape, optical media such as a CD-ROM and a DVD, magneto-optical media such as a floptical disk, a ROM, a RAM, or a flash memory. Examples of the program commands may include a high-level language which may be executed by a computer using an interpreter or the like as well as a machine language wire as produced by a compiler. The hardware device may be configured to operate as one or more software modules in order to perform the operation of the exemplary embodiment, and vice versa.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. A computing apparatus for optimizing control parameters for improving a load change rate of a power plant comprising:
   a memory configured to store computer readable instructions; and
   one or more processor, coupled with the memory, configured to execute the computer readable instructions to perform steps comprising:
      configuring a forecast model of the load change rate of the power plant comprising a process model and a control model;
      correcting the process model by changing a first parameter of the process model using real operation data of the power plant; and
      tuning a time delay parameter of the corrected forecast model, the time delay parameter being related to a delayed response of the power plant, so that an calculation value of the corrected forecast model under the time delay parameter meets a target load increase rate of the power plant.

2. The apparatus for optimizing the control parameters for improving a load increase rate of the power plant of claim 1,
   wherein the real operation data comprises an input value and an output value corresponding to the input value, and
   wherein the correcting of the process model comprises changing the first parameter such that a root mean square deviation (RMSD) or a mean absolute deviation (MAD) between a calculation value of the process model and the real operation data of the power plant becomes the minimum when the input value is input to the process model.

3. The apparatus for optimizing the control parameters for improving load change rate of the power plant of claim 2,
   wherein the first parameter is changed within a preset correction range.

4. The apparatus for optimizing the control parameters for improving a load charge rate of the power plant of claim 3,
   wherein the first parameter comprises at least one of a property curve of a spray valve, a time delay of a fuel, and a property time of a heat exchanger.

5. The apparatus for optimizing the control parameters for improving a load change rate of the power plant of claim 1,
   wherein the corrected forecast model comprises one or more function comprising the time delay parameter and an input variable and a target value corresponding to the input variable are provided and the tuning of the time delay parameter comprises correcting the time delay parameter such that a difference between the calculation value of the corrected forecast model and the target load increase rate becomes the minimum when the input variable is input to the corrected forecast model.

6. The apparatus for optimizing the control parameters for improving a load change rate of the power plant of claim 1, wherein the processor is configured to determine that the calculation value of the corrected forecast model under the time delay parameter meets the target load increase rate of the power plant based on the minimum difference between the calculation value of the corrected process model and the target load increase rate.

7. The apparatus for optimizing the control parameters for improving a load change rate of the power plant of claim 1, wherein the process model comprises:
a flow rate calculating module configured to calculate the flow rate of a superheater reducer;
a heat-input calculating module configured to calculate a heat-input; and
a steam temperature calculating module configured to calculate a steam temperature.

8. The apparatus for optimizing the control parameters for improving a load change rate of the power plant of claim 7, wherein the configuring of the forecast model comprises modeling each of the flow rate calculating module, the heat-input calculating module, and the steam temperature calculating module in a form of a block line diagram based on a time delay function.

9. A computing apparatus for optimizing control parameters for improving a load change rate of a power plant comprising:
a memory configured to store compute readable instructions; and
one or more processor, coupled with the memory, configured to execute the computer readable instructions to perform steps comprising:
correcting a first parameter of a process model for the load change rate of the power plant by changing a first parameter of the process model using real operation data of the power plant in a forecast model comprising the process model and a control model; and
tuning a time delay parameter of the corrected forecast model, the time delay parameter being related to a delayed response of the power plant, so that a calculation value of the corrected forecast model under the time delay parameter meets a target load increase rate of the power plant.

10. The apparatus for optimizing the control parameters for improving a load change rate of the power plant of claim 9,
wherein the real operation data comprises an input value and an output value corresponding to the input value, and
wherein the correcting of the process model comprises changing the first parameter such that a root mean square deviation (RMSD) or a mean absolute deviation (MAD) between a calculation value of the process model and the real operation data of the power plant becomes the minimum when the input value is input to the process model.

11. The apparatus for optimizing the control parameters for improving load changing rate of the power plant of claim 10,
wherein the first parameter is changed within a preset correction range.

12. The apparatus for optimizing the control parameters for improving a load change rate of the power plant of claim 11,
wherein the first parameter comprises at least one of a property curve of a spray valve, a time delay of a fuel, and a property time of a heat exchanger.

13. The apparatus for optimizing the control parameters for improving a load change rate of the power plant of claim 9,
wherein the corrected forecast model comprises one or more function comprising the time delay parameter an input variable and a target value corresponding to the input variable are provided, and the tuning of the time delay, parameter comprises correcting the time delay parameter such that a difference between the calculations value of the corrected forecast model and the target value becomes the minimum when the input variable is input to the corrected forecast model.

14. A method for optimizing control parameters for improving a load change rate of a power plant, the method operating a non-transitory computer readable medium with instruction stored thereon, that when executed by one or more processor, perform steps comprising:
configuring a forecast model of the load change rate of the power plant comprising a process model and a control model;
correcting the process model by changing a first parameter of the process model using real operation data of the power plant; and
tuning a time delay parameter of the corrected forecast model, the time delay parameter being related to a delayed response of the power plant so that the calculation value of the corrected forecast model under the time delay parameter meets a target load increase rate of the power plant.

15. The method of claim 14,
wherein the real operation data comprises an input value and an output value corresponding to the input value, and
wherein the correcting the first parameter of the process model comprises changing the first parameter such that a root mean square deviation (RMSD) or a mean absolute deviation (MAD) between a calculation value of the process model and the real operation data of the power plant becomes the minimum when the input value is input to the process model.

16. The method of claim 15,
wherein the first parameter is changed within a preset correction range.

17. The method of claim 16,
wherein the first parameter comprises at least one of a property curve of a spray valve, a time delay of a fuel, and a property time of a heat exchanger.

18. The method of claim 14,
wherein the corrected forecast model comprises one or more function comprising the time delay parameter and an input variable and a target value corresponding to the input variable are provided, and the tuning of the time delay parameter comprises correcting the time delay such that a difference between the calculation value of the corrected forecast model and the target load increase rate becomes the minimum when the input variable is input to the corrected forecast model.

19. The method of claim 14,
wherein the decision that the output value of the corrected forecast model under the time delay parameter meets the target load increase rate of the power plant is made based on the minimum difference between the calculation value of the corrected process model and the target load increase rate.

20. The method of claim 14,
wherein the process model comprises a flow rate calculating module configured to calculate the flow rate of a superheater reducer, a heat-input calculating module configured to calculate a heat-input, and a steam temperature calculating module configured to calculate a steam temperature.

* * * * *